United States Patent [19]

Chen

[11] Patent Number: 5,004,486
[45] Date of Patent: Apr. 2, 1991

[54] SUBMERGED-TYPE GAS CLEANING SYSTEM

[76] Inventor: Chun-Teh Chen, P.O. Box 55-1670, Taipei, Taiwan

[21] Appl. No.: 546,768

[22] Filed: Jul. 2, 1990

[51] Int. Cl.[5] .................................... B01D 47/00
[52] U.S. Cl. ......................... 55/222; 55/228; 55/255; 55/256; 55/DIG. 30; 261/DIG. 9; 110/215
[58] Field of Search ............... 55/222, 228, 255, 256, 55/DIG. 30; 261/DIG. 9; 110/215

[56] References Cited

U.S. PATENT DOCUMENTS

| | | | |
|---|---|---|---|
| 370,936 | 10/1887 | Drake | 55/222 |
| 584,344 | 6/1897 | Gerardin et al. | 55/222 |
| 1,187,208 | 6/1916 | Wahl | 55/228 |
| 1,594,324 | 7/1926 | Payne | 55/256 |
| 1,964,794 | 7/1934 | Gilbert | 55/255 |
| 4,843,979 | 7/1989 | Phillips | 110/215 |

Primary Examiner—Bernard Nozick

[57] ABSTRACT

A gas cleaning system includes a combustion equipment, a heat exchanger for cooling a flue gas discharged from the combustion equipment, an exhaust fan sucking the gas from the heat exchanger and directing the gas into a bubbling dust separator submerged in a water tank so that the dust laden in the gas will be rubbed off when the gas is bubbled through the separator to discharge a clean gas from a stack mounted in the water tank for preventing air pollution.

4 Claims, 2 Drawing Sheets

SUBMERGED-TYPE GAS CLEANING SYSTEM

BACKGROUND OF THE INVENTION

A flue gas discharged from a conventional combustion equipment such as a boiler or an incinerator if being discharged to the atmosphere will cause serious air pollution due to smoke, dust, carbon or other organic matters laded in the gas. If the waste gas after combustion is led into an electrostatic precipitator, the dust laden in the gas may be removed by the precipitator. However, the high installation and maintenance cost of the precipitator may increase a financial burden of especially of a small business. Meanwhile, the heat carried by the flue gas if not received before enterring the precipitator may waste energy and the still hot flue gas may deteriorate the precipitator equipment.

The present invention has found the shortcomings of conventional combustion equipment and dust precipitator and invented the present submerged type gas cleaning system.

SUMMARY OF THE INVENTION

The object of the present invention is to provide a gas cleaning system including a combustion equipment, a heat exchanger for cooling a flue gas discharged from the combustion equipment, an exhaust fan sucking the gas from the heat exchanger and directing the gas into a bubbling dust separator submerged in a water tank so that the dust laden in the gas will be rubbed when the gas is bubbled through the separator to discharge a clean gas from a stack mounted on the water tank for preventing air pollution.

DETAILED DESCRIPTION

Figure 1:
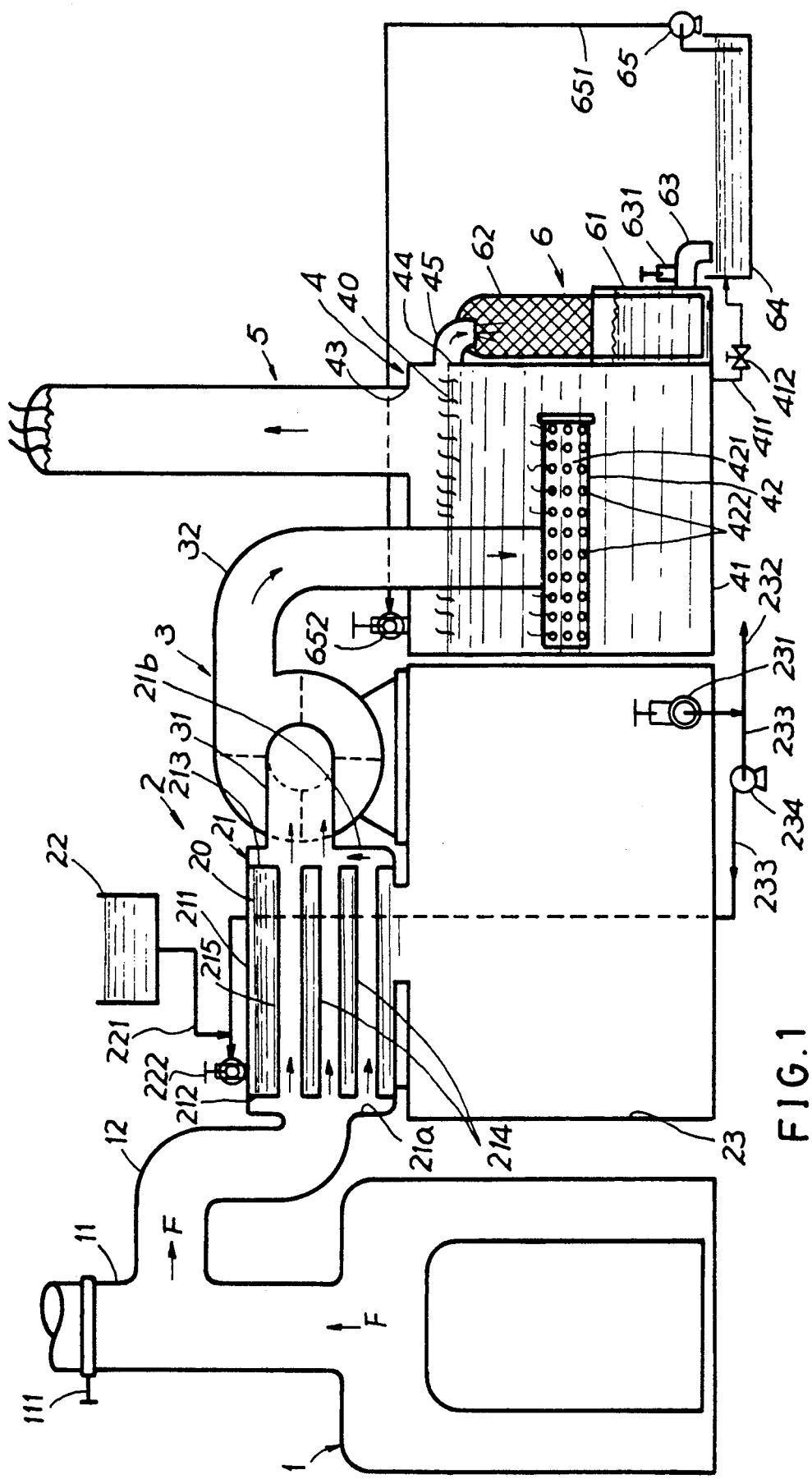
FIG. 1 is a systematic diagram of the present invention.

As shown in the figures, the present invention comprises: a combustion equipment 1 such as a boiler, an incinerator or the like, a cooling means 2, an exhaust fan 3, a bubbling dust separating means 4, a stack for discharging treated gas 5, and a dust collection means 6.

A flue gas from a burning combustion equipment 1 is bypassed through a side duct 12 to the cooling means 2. An original main stack 11 of the combustion equipment 1 having a valve 111 may be closed for treating the flue gas through the systematic equipments of this application.

The cooling means 2 includes: a gas-cooled heat exchanger 21, a cooling water source 22 for supplying fresh cooling water into the heat exchanger 21 through a feed pipe 221 and a valve 222, and a water storage tank 23 positioned under the exchanger 21 for storing the heat-exchanged water.

Figure 2:
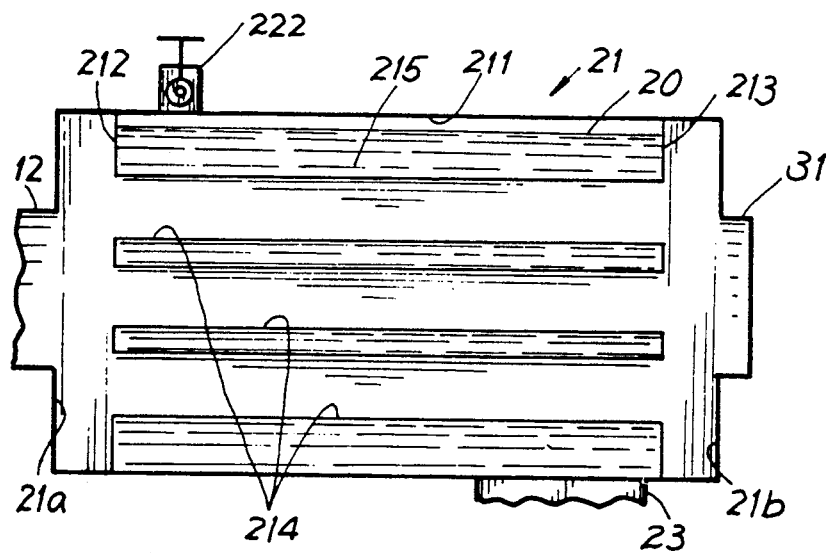
FIG. 2 is a front view sectional drawing of the heat exchanger of the present invention.
Figure 3:
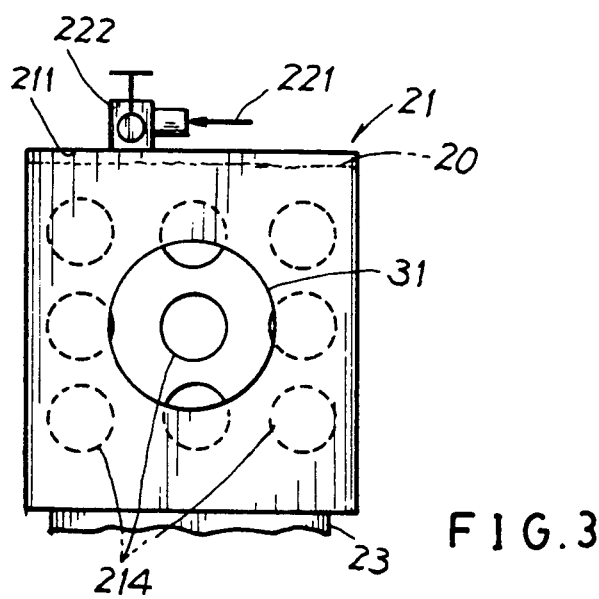
FIG. 3 is a side view of the heat exchanger of the present invention.

The gas-cooled heat exchanger 21 as shown in FIG. 1–3 includes: a shell 211 defining a heat-exchange chamber 215 therein, a front partition plate 212 formed in the front shell portion at the gas inlet port 21a, a rear partition plate 213 formed in the rear shell portion at the gas outlet port 21b, and a plurality of internal tubes 214 passing through the chamber 215 in the shell 211 and secured between the two partition plates 212, 213. The flue gas F will pass through the internal tubes 214, whereas the cooling water will flow through or pass the outside surfaces of the tubes 214 in the shell 211. The storage tank 23 includes a warm water outlet pipe 232 having a bottom valve 231 formed on a bottom portion of the tank 23. A recycling pipe 233 may be branched from the outlet pipe 232 to recycle water as boosted by a first recycling pump 234 into the feed pipe 221 for a recycled heat-exchanging operation in cooling means 2.

The exhaust fan 3 has an inlet duct 31 connected with the outlet port 21b of the heat exchanger 21 and an outlet duct 32 connected to the bubbling dust separating means 3, which outlet duct 32 is submerged in a water level in the bubbling means 4.

Figure 4:
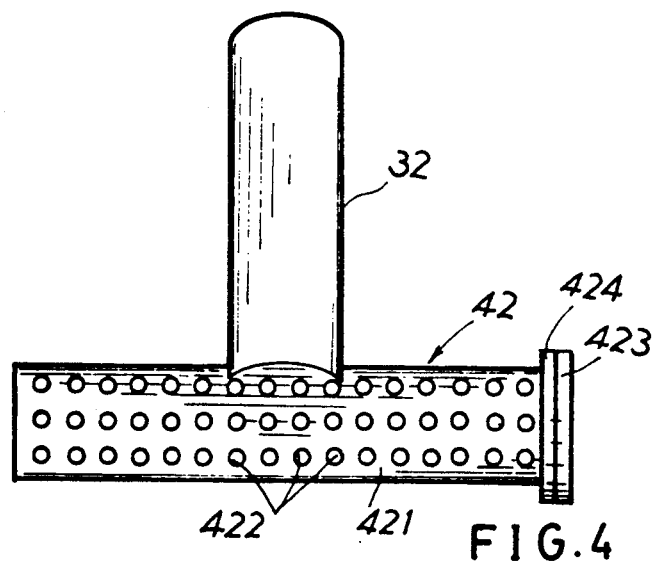
FIG. 4 is an illustration showing a bubbling dust separator of the present invention.
Figure 5:
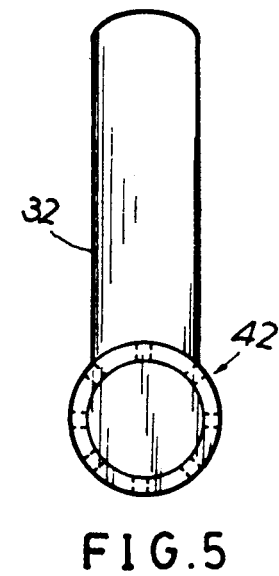
FIG. 5 is a side view illustration of the dust separator of the present invention.

The bubbling dust separating means 4 includes: a bubbling water tank 41, a bubbling dust separator 42, a stack 5 mounted on the tank 41 communicated with the flue gas port 43, and an outlet pipe 45 connected with an overflow weir 44 formed on an upper portion of the tank 41. The bubbling water tank 41 is filled with water to reach an upper water level 40 coplanar to the weir 44. The bubbling dust separator 42 is submerged in the tank 41 under the water level 40, which includes a closed hollow body 421 communicated with the fan 3 and generally shaped as a cylinder as shown in FIG. 4, 5, a plurality of perforations 422 drilled in the hollow body 421, and a blind plate 423 sealing an opening end 424 of the body 421. The blind plate 423 may be removed for removing dust or sludge accumulated in the hollow body 421.

The dust collection means 6 includes: a dust collector 61 pertinent to the bubbling water tank 41 under the outlet pipe 45 of the dust separating means 4, a filter bag 62 held in the collector 61 for receiving floating dust, carbon or smoke overflowing from the weir 44, a drain pipe 63 having a valve 631 formed on a bottom portion of the collector 61, a settling tank 64 for receiving dust water from the drain pipe 63 and receiving sludge water from a sludge pipe 411 having a valve 412 formed on a bottom of the tank 41, and a seconed recycling pump 65 for recycling the clear water in the tank 64 into the bubbling tank 41 by means of a recycling pipe 651 and a valve 652.

In operating the present invention, the hot flue gas from the combustion equipment 1 is cooled in heat exchange 21 of the cooling means 2 as sucked by the fan 3. The cooled gas is then directed into the bubbling dust separator 42, through which separator 42 the gas will be bubbled through the plural perforations 422. The dust, carbon, particulate, smoke or the like laden in the gas will be rubbed when bubbling the gas through the perforations 422, from which the rubbed clean waste gas will emit to discharge through the stack 5, and the light dust as floated to overflow through the weir 44 will be collected into bag 62, and the heavy dust will sink at the bottom of the tank 41 for removing sludge therefrom.

The cooling water as heated in the heat exchanger 21 will be stored in tank 23 for preheating a boiler feed water or for supplying warm water for other uses. The cooling water may be continuously sprayed or fed into the heat exchanger 21 from the source 22 and the heated water may be subsequently output through the pipe 232.

Or the water may be recycled for forced circulation in the heat exchanger 21, the tank 23 and the pump 234.

The present invention has the following advantages superior to a conventional waste gas treatment facilities:

1. The precooled flue gas is bubbled to remove its laden dust or smoke under a water level. Low installation cost, smooth operation and minor maintenance problems will be caused in this invention.
2. The pre-cooling of the flue gas may recover waste heat carried in the flue gas for energy-saving purpose.
3. The gas is rubbed off its carried dust when bubbled through the separator 42, other than a conventional water scrubber which requires high-pressure water spraying for scrubbing dust laden in the gas, so that the electric energy for driving a conventional scrubber pump will thus be saved.
4. There is no need to provide other metallic screen for filtering off the dust laden in the gas since the bubbling separator may remove the dust from the gas.

I claim:

1. A submerged-type gas cleaning system comprising:
   a combustion equipment producing flue gas when burned, having a by-pass gas duct branched from a main stack of the combustion equipment;
   a cooling means connected to said by-pass gas duct of the combustion equipment for pre-cooling the flue gas passing therethrough;
   an exhaust fan having an inlet duct connected to said cooling means and an outlet pipe;
   a bubbling dust separating means for receiving a pre-cooled flue gas from the outlet duct of the exhaust fan, having a bubbling dust separator submerged under a water level in a bubbling water tank for removing dust laden in the gas when bubbled through the bubbling dust separator;
   a stack for discharging treated gas mounted on said bubbling water tank; and
   a dust collection means for recovering dust, smoke or particulate matters separated from the water;
   said bubbling dust separator including a closed hollow body drilled with a plurality of perforations in the hollow body communicated with the outlet duct of the exhaust fan for bubbling flue gas through the perforations for rubbing off dust, smoke or particulate matters therefrom.

2. A gas cleaning system according in claim 1, wherein said bubbling dust separator is generally formed as a cylindrical shape having a blind plate sealing an end opening of said dust separator.

3. A gas cleaning system according to claim 1, wherein said cooling means includes a gas-cooled heat exchanger having a plurality of internal tubes formed in a shell of the heat exchanger fluidically communicated with the combustion equipment and the exhaust fan, a cooling water source supplying cooling water into a heat-exchange chamber in the shell for cooling the flue gas passing through the internal tubes, and a water storage tank positioned under the heat exchanger for storing heat-exchanged water.

4. A gas cleaning system according to claim 1, wherein said dust collection means includes a dust collector adjacent to the bubbling water tank of the bubbling dust separating means having a filter bag held in the collector for receiving floating dust overflowing from the bubbling water tank, and a settling tank for receiving the dust water or sludge water drained from said collector and said bubbling water tank.

* * * * *